April 14, 1925.  1,533,165
M. O. CROSS
METHOD OF INDEXING GEARS
Original Filed April 5, 1918  2 Sheets-Sheet 1

Inventor
Milton O Cross.

By
Attorney

April 14, 1925.

M. O. CROSS

METHOD OF INDEXING GEARS

Original Filed April 5, 1918    2 Sheets-Sheet 2

1,533,165

Inventor
Milton O. Cross.

By Charles E. Wiser

Attorney

Patented Apr. 14, 1925.

1,533,165

UNITED STATES PATENT OFFICE.

MILTON O. CROSS, OF DETROIT, MICHIGAN.

METHOD OF INDEXING GEARS.

Original application filed April 5, 1918, Serial No. 226,829. Divided and this application filed July 17, 1922. Serial No. 575,452.

*To all whom it may concern:*

Be it known that I, MILTON O. CROSS, a citizen of the United States, residing at Detroit, county of Wayne, State of Michigan, have invented a certain new and useful Improvement in Methods of Indexing Gears, and declare the following to be a full, clear, and exact description of the same, such as will enable others skilled in the art to which it pertains to make and use the same, reference being had to the accompanying drawings, which form a part of this specification.

This invention relates to a method of indexing gears adapted more particularly for use with tooth rounding machines such as is described in my U. S. Patent No. 1,279,278 of September 17, 1918, and the purpose of this invention is to provide a method of indexing gears that is adapted for universal use in indexing gears of any desired number of teeth. This application is further a division of application Serial No. 226,829, filed April 5, 1918, patented August 22, 1922, Patent No. 1,426,552 and the feature of this invention is in the method of indexing a gear having teeth cut or formed during a previous indexing and in strict conformity with such previous indexing to present the teeth thereof successively for operation by a cutter. The method consists in first turning the gear while free from the cutter to approximately correct position then releasing the gear from control of the indexing devices and then causing engagement thereof with a member having complemental teeth whereby the gear is fixedly indexed by said complemental teeth and correctly positioned relative to the cutter. These objects and features of the invention are hereinafter more fully described and claimed, and the preferred means for performance of the method is shown in the accompanying drawings in which—

Figure 2:
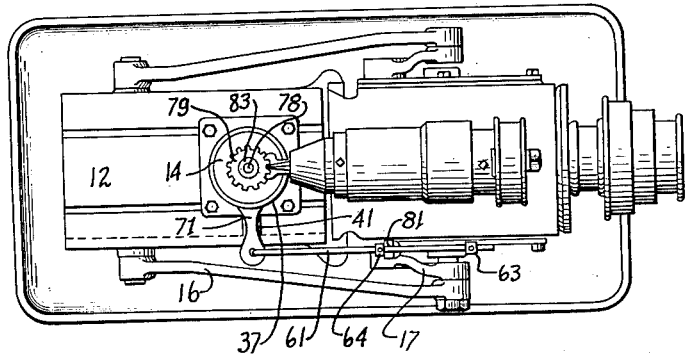
Fig. 2 is a plan view thereof.
Figure 1:
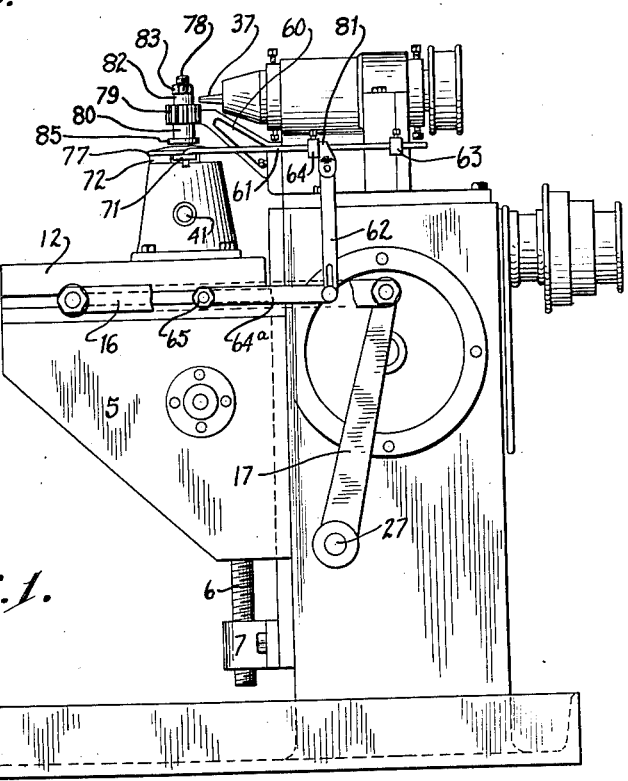
Fig. 1 is a side elevation of a tooth rounding machine showing my improved indexing mechanism in conjunction therewith.
Figure 6:
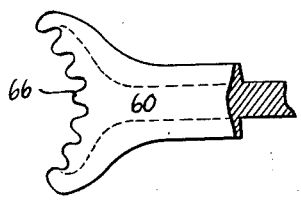
Fig. 6 is a plan view of a sector used to rectify error in indexing.

The operation of a tooth rounding machine is fully described in my former Patent No. 1,279,278, the only feature thereof herein requiring mention being the sector 60 attached to the forward part of the machine above the table 12. This sector has an internal toothed face 66, the teeth being complemental to those of the gear to be cut, and this face engages the gear beneath the cutting tool 37 as shown in Fig. 1, being a sufficient distance from the tool to permit operation thereof after the manner described in said Patent No. 1,279,278. The sector is shown in plan in Fig. 6, and this sector is stationarily positioned on the machine frame 1 and the gear is carried by the head 14 which is movable backward and forward with the table 12. The table 12 slides on ways provided therefor and is moved by means of a bar 16 and lever 17 operated by means of a shaft 27, the operation of which shaft is described in the said patent. Movement of the table 12 carries with it the bar 64ª pivoted at 65 to the table, which bar is pivotally connected with the slotted end of the pivoted lever 62 mounted on the machine. This lever is provided with a forked end 81 and in the said fork rides the rod 61 connected with the indexing device. This rod 61 has two collars 63 and 64 spaced apart thereon adapted to be engaged by the forked end on movement of the table, one collar being engaged on the outward movement of the table and the other being engaged on the inward movement of the table. These collars are adjustably carried on the rod so that an adjustment may be had to vary the extent of rotation of the gear by the rod 61. By use of a movable stop a quick action of the clutch member is secured just at the completion of movement of the table in either direction. As the stop 81 is moving in a direction the reverse of that of either of the stops when engaging therewith the rod 61 is not only caused to cease movement but is actually moved in a direction opposite to that of the table and clutch.

The release of binding of the clutch therefore is accomplished in a much shorter period than would be possible with a fixed stop. By varying the point of pivoting of the lever 62, the movement of the rod 61 may be greater than the distance the clutch and gear holder is moved to the table.

Figure 3:
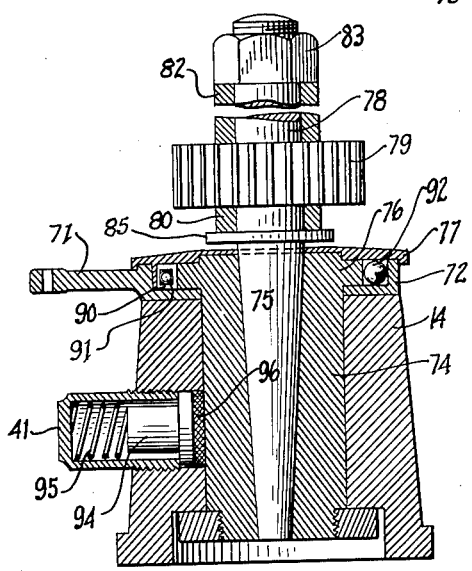
Fig. 3 is a vertical section of the indexing mechanism.

This rod 61 engages an arm 71 formed integrally with a ring member 72 which is rotatably mounted on the upper end of the head 14 and is centrally apertured to receive the arbor 74 for the spindle 75 which carries the gear. This arbor 74 has a flange 76 at the upper end lying within an annular recess in the ring member 72 and retains the ring in place on the head. A cap member 77 is carried by the arbor and engages over the ring member 72 as shown in Fig. 3. The arbor is provided with a central conical aperture in which the coned spindle 75 fits and the upper end of the spindle is provided with a cylindrical part 78 adapted to receive the gear 79 as shown. To position the gear longitudinally of the portion 78, a sleeve 80 is utilized beneath the gear resting on a flange 85 of the spindle and a second sleeve 82 is provided on the upper side of the gear and the end of the portion 78 is threaded to receive a nut 83 for binding the gear in place on the spindle. By use of the sleeves the gear is positioned vertically as may be desired. Adjustment of the vertical position of the gear may also be secured by vertically adjusting the height of the table 12 and supporting element 5 therefor by rotation of the screw 6 which is in threaded relation with a boss 7 attached to the base of the machine as shown in Fig. 1.

Figure 4:
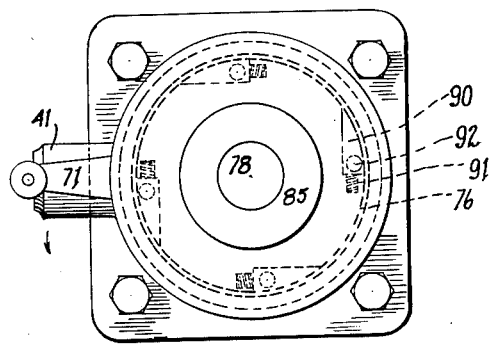
Fig. 4 is a plan view thereof.
Figure 5:
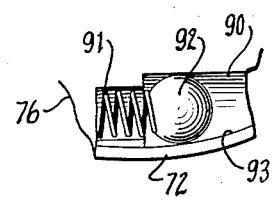
Fig. 5 is a detail of the clutch utilized to rotate the gear.

This flange member 76 of the arbor is provided with a plurality of marginal notches 90 preferably four in number as shown in Fig. 4 and the bottom of the notch is recessed to receive a spring 91. A ball 92 is positioned in the recess and is of a diameter to quite closely fit in the notch 90 between the wall thereof and inner face 93 of the ring member 72. The spring forces the ball into engagement with the wall of the notch and inner face of the ring.

It is to be noted that the inner wall of the notch 90 is at a right angle to a radial line passing through the center of the spindle 75 as will be understood from Fig. 4, or is parallel with a tangent to the inner circular face 93 of the ring and when assembled with the ring a recess is provided for the ball that is of a size at one end to just free the ball from the face 93 of the ring by rotative movement of the ring in one direction. On rotative movement of the ring in the opposite direction, however, the ball will tend to roll toward the point of the recess formed by the wall of the notch and the face of the ring which binds the ring to the arbor 74. It will, therefore, be seen that outward movement of the head 14 and engagement of the end 81 with the collar 63 at the end of the rod will draw the arm 71 toward the machine. On an inward movement of the arm 71 in one direction of the arrow shown in Fig. 4, the ball will tend to roll forward in the recess provided therefor and bind the ring to the arbor and turn the gear to the extent determined by the travel of the table and time of engagement of the collar 63 with the end 81 of the lever 62. This indexes the gear and on completion of the inward movement of the table to bring the gear to operative relation with the cutter 37, the collar 64 will engage the end 81 of the lever and turn the ring 72 in reverse direction, in which direction of movement the ring will turn without turning the arbor.

It is thus to be seen that, by each backward and forward movement of the table carrying the gear, the gear is turned to an extent determined by the setting of the collars 63 and 64 on the rod 61. It is evident, however, that an absolutely exact indexing cannot be secured by this arrangement alone. Inasmuch as there is a possible slight movement of the ring relative the arbor before the ball 92 is firmly engaged between the ring and arbor and also, inasmuch as it is not possible to manually set the collars 63 and 64 sufficiently to avoid discrepancy of such character, it is necessary to provide means for correcting possible error in the indexing device. The final positioning of the gear is therefore determined by the sector 60 which, as before stated, is provided with teeth complemental to the teeth of the gear, and the sector teeth are depended upon to set the gear to exact position for operation thereon by the cutter. This may be accomplished by reason of the very close setting of the gear to position by the indexing mechanism described and as the gear is brought into engagement with the sector 60 any slight discrepancy in position of the gear is corrected by engagement of the gear teeth with the teeth of the sector which has an accurately cut face for this purpose.

To prevent an overthrow of the arbor 74 by reason of the sudden engagement of the end 81 of the lever with either collar, a plug 41 is provided in the head 14 having a bearing member 94 and a spring 95 pressing the same against the side of the cylindrical arbor. A friction plate 96 is interposed between the end of the plug and the arbor so that the arbor is thus frictionally held from accidental rotation or overthrow. The problem solved by the described mechanism is peculiar. The gear to be operated upon by the mechanism shown is a previously cut or formed gear in which formation the blank has been indexed and, as both the indexing mechanism and the cutting mechanism has some inaccuracies in it caused by wearing of parts etc., the finished gear after being placed in a second similar indexing mechanism will not be indexed strictly in accord with the first indexing. In the gear tooth rounding machine which is the subject of my former Patent No. 1,279,278, a previously cut or formed gear is to be operated upon, the teeth having been formed by an indexing mechanism. In placing the gear in this tooth rounding machine of my former patent therefor, this gear must be indexed strictly in accord with the first indexing during which it was cut or formed, and the method by which such second indexing may be accurately performed is by utilizing a sector having teeth cut to conform to the character of the teeth of the gear to be operated and positioned relative to the tooth rounding cutter in such manner that a tooth of the gear when brought into mesh with the sector is accurately positioned relative to the tool. This is accomplished by turning the gear when out of engagement with the sector and tool to approximately its indexed position as nearly as the indexing device may position it and, subsequent to freeing it from the indexing mechanism, bringing it into mesh with the sector which sets the tooth accurately relative to the tool.

It is evident from the foregoing description that this method involves a guide or sector 60 as an important part of the mechanism, which guide is to be provided with teeth complemental to the teeth of the gear operated on. By this method of first approximately indexing the gear then freeing the gear from the indexing mechanism, and finally causing engagement thereof with a member having teeth complemental to the gear teeth in fixed position relative to the cutter, possible inaccuracies of the indexing mechanism are corrected and the gear is indexed in strict conformity with the indexing thereof when the gear teeth were first formed. It is further evident that my improved method of indexing formed gears may be utilized with other structures as for instance the tooth rounding machine shown in U. S. Patent to Victor Colliau No. 1,410,657, of March 28, 1922.

Having thus fully described my invention, what I claim is—

1. The method of indexing a gear having formed teeth consisting in first turning the gear to approximately index the same, releasing the gear to turn in either direction, and then causing engagement of the gear teeth with a part having teeth complemental thereto whereby the gear is fixedly indexed by formed teeth.

2. The method of indexing a gear, cut or formed during a previous indexing in strict conformity with the previous indexing to present a tooth thereof for operation by a cutter, consisting of first turning the gear when free from the cutter to approximately correct position, releasing the gear from control of the indexing device, and then bringing it to engagement with a member adapted to hold a tooth of the gear in accurate position relative to the cutter.

3. The method of indexing a gear having formed teeth which consists in turning the gear to approximately index the same, freeing the gear from the indexing means, and finally moving the gear into engagement with a part having teeth complemental thereto to force the gear to correctly indexed position.

4. The method of indexing a gear having teeth cut or formed during a previous indexing which consists in first turning the gear on its axis to approximately index the same, then freeing the gear to turn in either direction on its axis, then causing engagement of the gear with a part adapted to accurately position a tooth thereof to be operated upon in correctly indexed position.

5. The method of indexing a gear having teeth cut or formed during a previous indexing which consists in first turning the gear to approximately index the same, then freeing the gear to turn in either direction, then causing engagement of the gear with a fixed part adapted to engage the teeth thereof to cause the gear to turn to its final correct position.

6. The method of indexing a gear for a cutting operation on the ends of the teeth and in strict conformity with a previous indexing in formation of the teeth which consists in first turning the gear while free from the cutter to approximately index the same, releasing the gear from the indexing means to permit the same to turn in either direction, then causing the gear to be engaged by a member having a tooth complemental to the teeth of the gear and so positioned as to complete the indexing of the gear and hold the same in correct position relative to the cutter.

In testimony whereof, I sign this specification.

MILTON O. CROSS.